F. STAPP.
ORCHARD HEATING DEVICE.
APPLICATION FILED FEB. 15, 1909.

981,025.

Patented Jan. 10, 1911.
2 SHEETS—SHEET 1.

Witnesses
Otto E. Hoddick.
I. D. Thornburgh.

Inventor
Frederick Stapp.
By A. J. O'Brien
Attorney

F. STAPP.
ORCHARD HEATING DEVICE.
APPLICATION FILED FEB. 15, 1909.
981,025.
Patented Jan. 10, 1911.
2 SHEETS—SHEET 2.
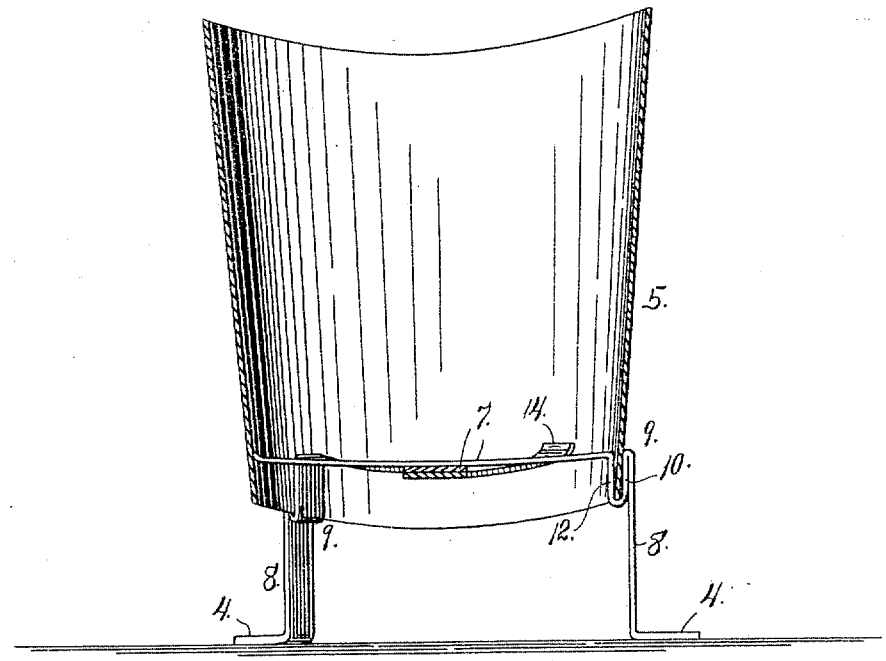
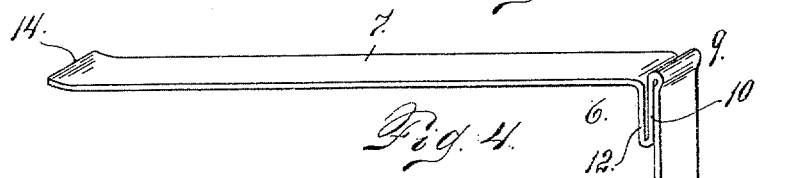
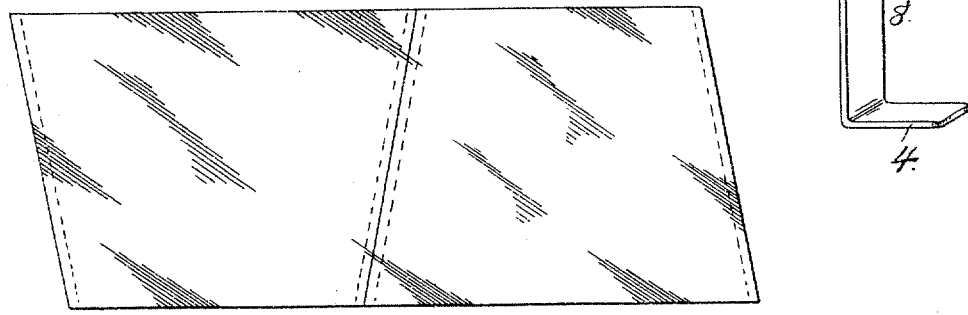
Witnesses
Otto E. Hoddick.
J. D. Thornburgh.
Inventor
Frederick Stapp.
By H. J. O'Brien
Attorney

UNITED STATES PATENT OFFICE.

FREDERICK STAPP, OF DENVER, COLORADO.

ORCHARD-HEATING DEVICE.

981,025.  Specification of Letters Patent.  Patented Jan. 10, 1911.

Application filed February 15, 1909. Serial No. 477,966.

*To all whom it may concern:*

Be it known that I, FREDERICK STAPP, a citizen of the United States, residing in the city and county of Denver and State of Colorado, have invented certain new and useful Improvements in Orchard - Heating Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in devices for heating orchards, or other localities, where vegetation is liable to be injured by frost in the absence of artificial heating protection.

It is well known that in many sections of the country orchards and other vegetation are liable to be injured by frost to such an extent as to practically ruin the crop.

The object of my present invention is to make it practicable, at comparatively small expense, to raise the temperature of such localities during the frost period, to such an extent as to prevent injury to the fruit or other vegetation from the aforesaid cause.

My further object is to provide a device which shall be exceedingly simple in construction, economical in cost, reliable, durable and efficient in use, and to these ends the invention consists of the features hereinafter described and claimed, all of which will be fully understood by reference to the accompanying drawing, in which is illustrated an embodiment thereof.

Figure 1:
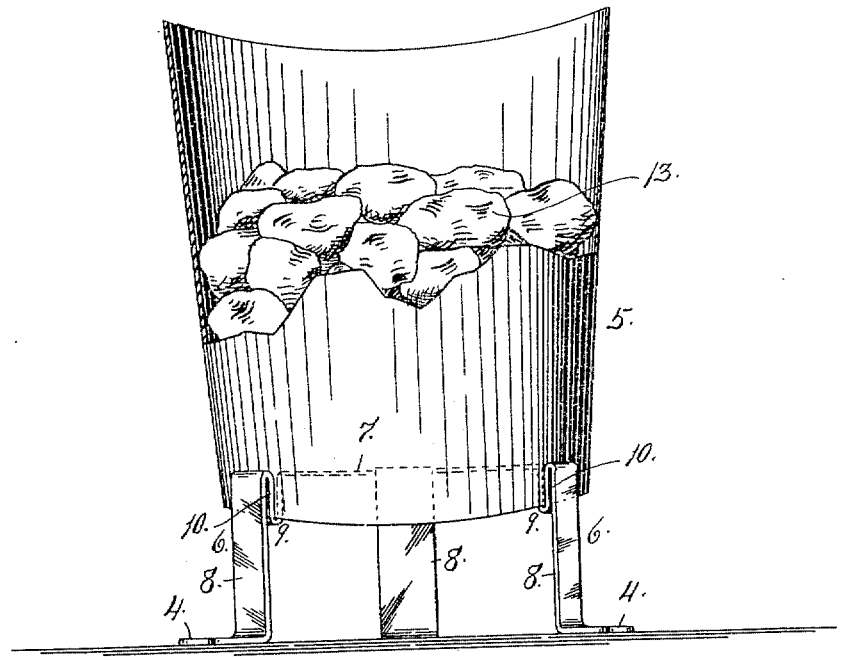
Figure 2:
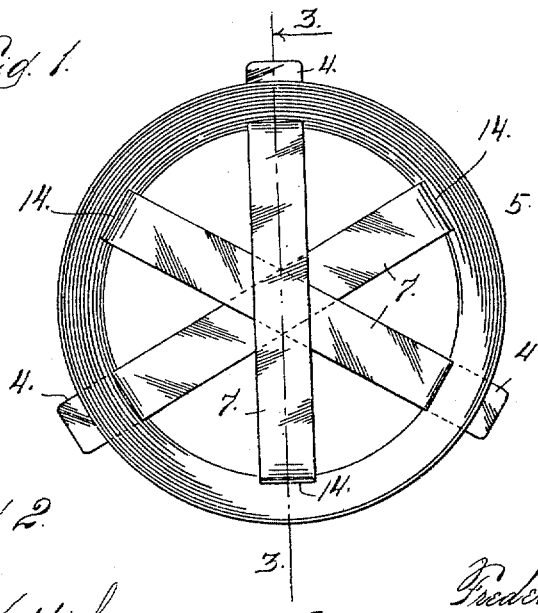

In this drawing, Figure 1 is an elevation of my improved orchard heating device, the upper portion being shown in section. Fig. 2 is a top plan view of the same. Fig. 3 is a vertical section of the device taken on the line 3—3 Fig. 2, the bar, however, through which the said line passes, being shown in elevation. Fig. 4 is a perspective view in detail, illustrating a combined grate bar and supporting leg, constituting the important feature of my invention, the parts being shown on a larger scale. Fig. 5 is a detail view, illustrating the manner of forming the body of the fuel receptacle.

The same reference characters indicate the same parts in all the views.

Let the numeral 5 designate the body or fuel receptacle of my improved orchard heating device. This receptacle is preferably composed of sheet metal cut into sections of the shape indicated in Fig. 5, and connected by properly seaming the same, the sections being arranged as shown in said figure, their upper and lower edges being parallel while their opposite edges are inclined toward each other from the upper to the lower edges of the plates. This construction is set forth in my previous application, entitled, "Heat and smoke generators," filed August 17, 1908, allowed October 23, 1908, Serial No. 448,965, and need not be further described in my present application, which relates to the manner of forming the support for the fuel receptacle in combination with the grate bars, or fuel support, connected with the bottom of the said receptacle.

As shown in the drawing, the fuel receptacle 5 is provided at its bottom with a number of members 6, of the construction shown in detail in Fig. 4, and also on a larger scale than in the other views. This member constitutes both a grate bar 7, and a supporting leg 8, provided with an outwardly turned foot 4. Parts 7 and 8 form right angles, or approximately right angles, with each other. The top of the part 8 and one extremity of the bar 7 are connected by an interposed, vertically disposed loop 9, formed by bending the member 6 intermediate its extremities down from the top of the leg 8 as shown at 10, and upwardly as shown at 12. Between the parts 10 and 12 a narrow space is left whereby the member is adapted to be applied to the lower edge of the receptacle 5 (see Figs. 1 and 3), whereby the said members may be readily applied and detached from the fuel receptacle or body of the device.

As shown in the drawing, there are three members 6 applied to the lower edge of the receptacle 5 in such a manner that the legs 8 form the support for the fuel receptacle, while the parts 7 form the grate in the lower part of the receptacle upon which the fuel 13 is supported. The combined legs and grate bars are suitably disposed, the bar members 7 crossing each other in the central part of the bottom of the receptacle as indicated in Fig. 2. The free extremities of the grate bar members 7 are preferably slightly turned outwardly, as shown at 14, whereby they rest against the inner wall of the fuel receptacle. As the latter is larger at the top than at the bottom and tapers from its upper extremity inwardly, the bars 7 will support the fuel, since, as the latter has a tendency to press them outwardly, they engage the inner wall of the receptacle more closely, whereby they are prevented from slipping out at the bottom of the receptacle. By virtue of this construction and arrangement, these bars form an effectual support for the fuel within the receptacle 5.

Having thus described my invention, what I claim is:

1. An orchard heating device consisting of a fuel receptacle composed of an open ended body portion and a plurality of devices removably connected with the lower edge of the body member, and forming at the same time supporting legs and grate bars, the grate bars extending at right-angles from the supporting legs entirely across the opening in the body member and having their free extremities turned upwardly to form means for engaging the inner surface of the receptacle, the said members being spaced to give a stable support to the fuel receptacle, whereby the grate bar portions cross one another in the central portion of the receptacle, substantially as described.

2. The combination in an orchard heating device of an open ended body member and a number of members removably applied to the lower edge of the body member, the removable members having parts bent to occupy positions approximately at right angles to each other, one part of each member forming a support for the fuel receptacle while the other part extends entirely across the opening in the body member and having its extremity curved upwardly to form means for engaging the inner surface of the body member, the said part constituting a grate bar, the said device having a relatively deep bend or loop adapted to engage the lower edge of the fuel receptacle, substantially as described.

3. A device of the class described comprising a fuel receptacle and a number of removable members, each of said members being bent intermediate its ends to form a leg and a fuel support, said member also being formed at the angle thereof to removably engage the lower edge of said receptacle at one side thereof, the free end of the said fuel support loosely engaging the opposite side of said receptacle, substantially as described.

In testimony whereof I affix my signature in presence of two witnesses.

FREDERICK STAPP.

Witnesses:
A. J. O'BRIEN,
A. EBERT O'BRIEN.